Aug. 18, 1964   G. R. RUSK ETAL   3,144,736
SPINDLE ASSEMBLY
Filed Sept. 12, 1961   2 Sheets-Sheet 1
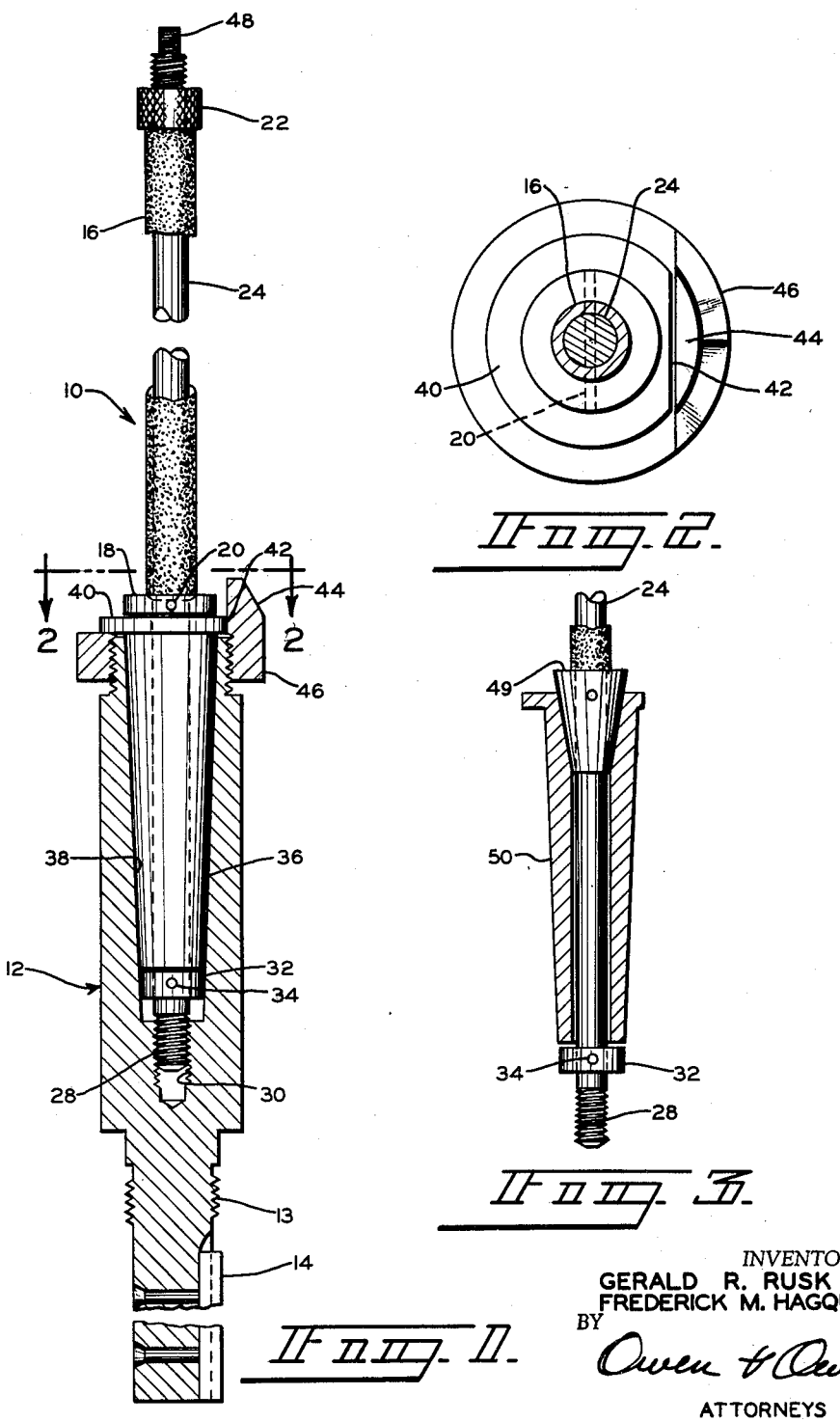
INVENTORS.
GERALD R. RUSK &
FREDERICK M. HAGQUIST
BY
Owen & Owen
ATTORNEYS

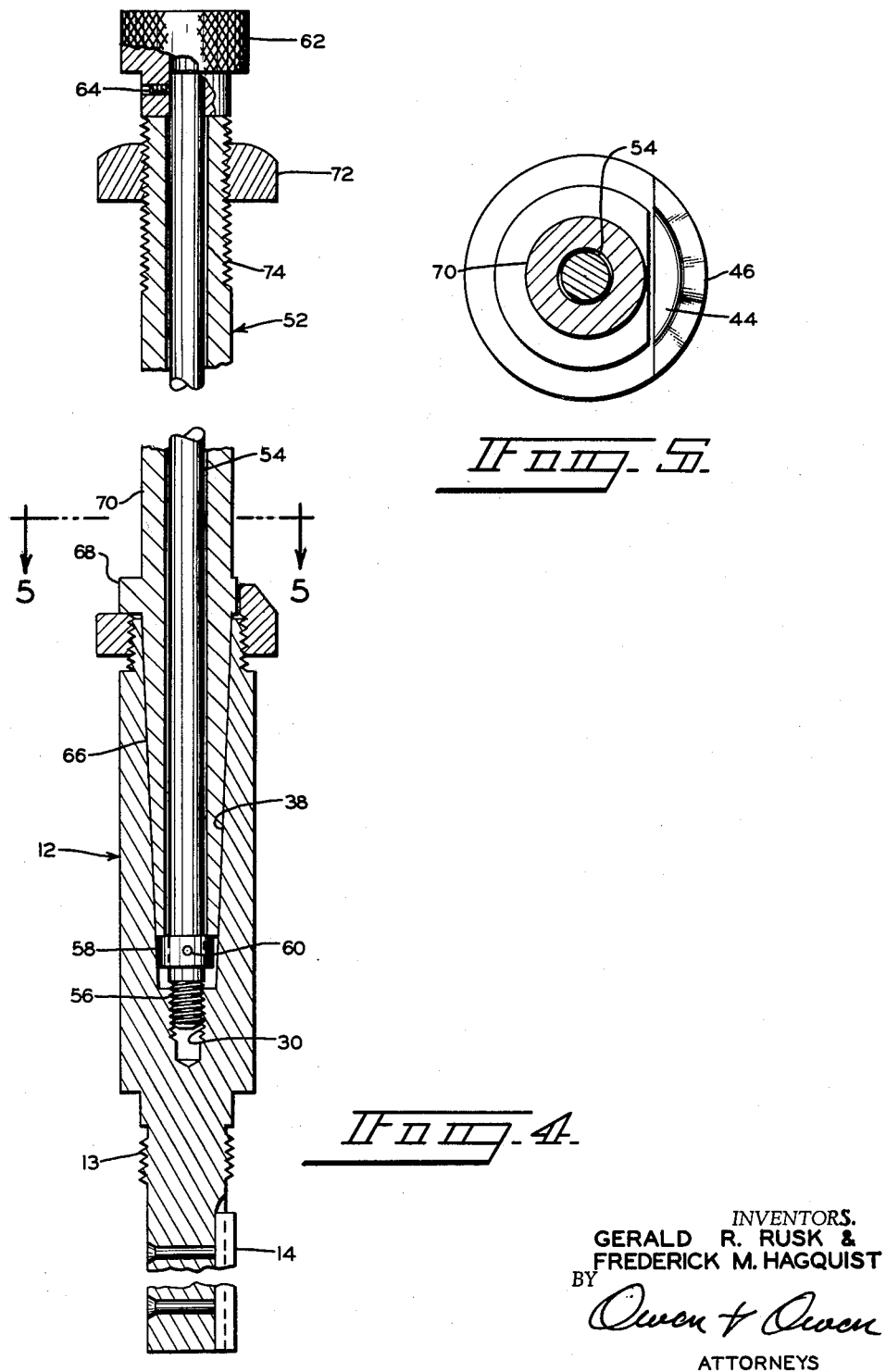

3,144,736
SPINDLE ASSEMBLY
Gerald R. Rusk, Maumee, and Frederick M. Hagquist, Toledo, Ohio, assignors to The Freeman Supply Company, Toledo, Ohio, a corporation of Ohio
Filed Sept. 12, 1961, Ser. No. 137,669
5 Claims. (Cl. 51—168)

This invention relates to an improved tilting arbor or spindle assembly for sanders and the like and specifically to a spindle assembly for mounting a sanding sleeve on a sander.

At the present, tool members including sanding sleeves usually are mounted on machines and connected to the drive mechanism thereof by chucks or collets. An operator usually must use both hands and two tools to remove a tool member from this type of mounting because he must simultaneously keep the tool member from turning and loosen the chuck or collet. Tool members are also commonly connected to drive mechanisms by friction fit, matching tapered bodies. These usually require the cumbersome and time consuming use of a pry bar to aid in their separation. Further, if foreign material is inadvertently located between the bodies, they will not fit properly and may separate during rotation thereof. An improper fit frequently results in damage to at least one of the bodies and decreases their life.

The present invention provides a new spindle mounting which overcomes the above disadvantages. The new mounting enables easy and rapid assembly and disassembly, relative to a driven female spindle, of a male spindle carrying a sanding sleeve or other tool member. The spindle mounting according to the invention is particularly advantageous for sanders because of the necessity for frequent spindle disengagement to enable changes of sanding sleeves. The new mounting also provides a positive, mechanical connection between the male and female spindles with relative movement therebetween being effectively prevented, so that less wear occurs than in mountings heretofore known.

It is, therefore, a principal object of the invention to provide an improved spindle mounting which facilitates the assembly and disassembly of male and female spindles.

Other objects and advantages of the invention will be apparent from the following detailed description of a preferred embodiment thereof, reference being made to the accompanying drawings, in which:

FIG. 1 is a view in longitudinal cross section of an assembly according to the invention comprising a male spindle and a female spindle;

FIG. 2 is a cross-sectional view taken along the line 2—2 of FIG. 1;

FIG. 3 is a fragmentary view in longitudinal cross section of a slightly modified male spindle;

FIG. 4 is a view in longitudinal cross section of a modified assembly according to the invention; and FIG. 5 is a cross-sectional view taken along the line 4—4 of FIG. 3.

Referring to the drawings, and more particularly to FIG. 1, an assembly according to the invention comprises a male spindle 10 assembled relative to a female spindle 12. The female spindle 12 is threaded as indicated at 13 for engagement with a driving mechanism (not shown) of a sander or the like, and carries a key 14 for locking. The male spindle 10 carries a sanding sleeve 16 which is rotated therewith. The sleeve 16 is held between a first stop member 18, which is held in place by a pin 20, and a nut 22, which is threaded onto a central supporting shaft 24.

The shaft 24 has a lower threaded portion 28 which is turned into a blind, threaded opening 30 in the female spindle 12. A second stop member 32 is fastened by a suitable pin 34 to the shaft 24 above the threaded portion 28. A frusto conical body 36 is rotatably mounted on the shaft 24 and is longitudinally positioned between the first stop member 18 and the second stop member 32. The body 36 is drawn into frictional engagement in a correspondingly tapered recess 38 of the female spindle 12 by turning of the portion 28 into the opening 30. The frictional engagement aligns the spindles and prevents relative rotation.

In some instances it may be desired to prevent rotation of the tapered body 36 relative to the tapered recess 38 into which it fits. For this purpose, the tapered body 36 can have a flange 40 with a flattened portion 42 (see also FIG. 2) adjacent a tab 44 of a ring 46 which is threaded onto the female spindle 12. When the ring 46 is locked relative to the female spindle 12, the tab 44 cooperates with the flattened part 42 of the flange 40 to prevent relative rotation of the tapered body 36.

To assemble the male spindle 10 with respect to the female spindle 12, the end 28 of the shaft 24 is turned into a blind opening 30 to move the body 36 into firm frictional engagement in the recess 38. The stop member 18 is also frictionally engaged with the upper surface of the tapered body 36 and the lower portion 28 of the shaft 24 is drawn tightly against the threads of the blind opening 30. As a consequence, the male spindle 10 and the female spindle 12 are frictionally engaged in accurately positioned assembled relationship. They are also locked against relative rotation, most effectively against rotation that would advance the shaft 24 into the opening 30.

The male spindle 10 can be readily removed from the female spindle 12 simply by turning the shaft 24 to withdraw it from the threaded blind opening 30. The second stop member 32 is also withdrawn, and, in turn, withdraws the tapered body 36 from the recess 38. A non-circular tip 48 is provided at the upper end of the rod 24 for engagement by a wrench or the like to facilitate turning thereof. The female spindle 12 can be provided with a lock, if desired, to prevent it from turning when the male spindle 10 is removed.

To be certain that the sleeve 16 and the shaft 24 will be concentric with the female spindle 12, a modified first stop member 49 and a modified tapered body 50 are employed, as shown in FIG. 3. The stop member 49, which is pinned to the shaft 24, is of frusto conical shape and is drawn into a frusto conical recess 51 in the tapered body 50 as the shaft 24 is turned into the opening 30. This automatically centers the shaft 24 with the body 50 even though the shaft 24 otherwise has a loose fit with the central passage of the body 50.

The above-discussed embodiment of the invention is particularly effective for small sanding sleeves from ¼" to ½", the diameter of the outer portion of the shaft 24 being different for different sized sleeves. However, for sanding sleeves of ¾" diameter and larger, a modified male spindle 52 as shown in FIGS. 4 and 5 is preferred. The spindle 52 is assembled with the female spindle 12 which has been discussed above and which is shown in FIG. 1. The male spindle 52 has a shaft 54 which includes a lower threaded portion 56 turned into the blind, threaded opening 30 in the female spindle 12. A stop member 58 is affixed to the shaft 54 near the threaded portion 56 by any suitable means such as a pin 60. A knurled knob 62 is affixed, by means of a setscrew 64, to the end of the shaft 54 opposite the threaded portion 56. When the knob 62 is turned, the shaft 54 is rotated, and the threaded portion 56 is advanced into the blind opening 30, or withdrawn therefrom.

A tapered, frusto conical body 66 is rotatably mounted on the shaft 54 adjacent the stop member 58 and is integral with a flange 68, which, in turn, is integral with an elongate hub 70. The hub 70 is designed to carry a sanding sleeve or a sanding drum (not shown) which is slidable relative to the hub 70, but engaged between the flange 68 and a nut 72 which is turned onto an upper threaded portion 74 of the hub 70. The hub 70 carries a workpiece in the same manner as does the upper portion of the shaft 24 of the FIG. 1 assembly, but differs from such shaft portion in that it is not connected directly with the shaft 54. As a consequence, a heavy torque on an associated sanding sleeve or drum cannot force the threaded portion 56 further into the opening 30 and thus render difficult the removal of the shaft 54. Hence, the spindle 52 with the hub 70 is particularly effective for use with sleeves and drums of larger diameter wherein the torque is apt to be larger.

To assemble the male spindle 52 with respect to the female spindle 12, the knurled knob 62 of the shaft 54 is rotated to turn the threaded portion 56 into the blind opening 30. The knob 62 serves as a stop member, urging the hub 70, the flange 68, and the tapered body 66 downwardly with the shaft 54 until the body 66 is seated in the recess 38. When the shaft 54 is withdrawn the stop member 58 urges the tapered body 66 out of the recess 38. It will be seen that the male spindle 52 functions very similarly to the male spindle 10 but provides a different mounting for a sanding sleeve or sanding drum, particularly for one of larger diameter than the sleeve 16 of FIG. 1.

Various modifications of the above described invention will be apparent to those skilled in the art and it is to be understood that such modifications can be made without departing from the spirit and scope of the invention as defined in the accompanying claims.

We claim:

1. A spindle assembly adapted for mounting on a drive shaft, for carrying a tool member, and for transmitting power from the drive shaft to the tool member, said assembly comprising in combination, a female spindle having a tapered recess therein with a closed small end and an open large end, and having a threaded opening at the small end of the recess, the recess and the threaded opening being coaxial with said spindle, means associated with said spindle and releasably engageable with the drive shaft, a male spindle including a shaft having a threaded end engaged in the opening of said female spindle, a tapered body rotatably and slidably mounted on said shaft and frictionally engaged in said recess, and spaced stop members affixed to said shaft, one on each side of said body, and effective to limit longitudinal movement of said body relative to said shaft.

2. A spindle assembly adapted for mounting on a drive shaft, for carrying a tool member, and for transmitting power from the drive shaft to the tool member, said assembly comprising in combination, a female spindle having a tapered recess therein with a closed small end and an open large end, and having a threaded opening at the small end of the recess, the recess and the threaded opening being coaxial with said spindle, means associated with said spindle and releasably engageable with the drive shaft, a male spindle including a shaft having a threaded end engaged in the opening of said female spindle, a tapered body rotatably and slidably mounted on said shaft and frictionally engaged in said recess, and spaced stop members affixed to said shaft, one on each side of said body, and effective to limit longitudinal movement of said body relative to said shaft, one of said stop members being within the recess and the other being outside the recess.

3. A spindle assembly adapted for mounting on a drive shaft, for carrying a tool member, and for transmitting power from the drive shaft to the tool member, said assembly comprising, in combination, a female spindle having a tapered recess therein with a closed small end and an open large end, and having a threaded opening at the small end of the recess, the recess and the threaded opening being coaxial with said spindle, means associated with said spindle and releasably engageable with the drive shaft, a male spindle including a shaft having a threaded end engaged in the opening of said female spindle, a tapered body rotatably and slidably mounted on said shaft and frictionally engaged in said recess, and a stop member affixed to said shaft and effective to limit longitudinal movement of said body relative to said shaft and to aid in withdrawing said body from the recess when said shaft is unscrewed.

4. A spindle assembly adapted for mounting on a drive shaft, for carrying a tool member, and for transmitting power from the drive shaft to the tool member, said assembly comprising, in combination, a female spindle having a tapered recess therein with a closed small end and an open large end, and having an opening at the small end of the recess, the recess and the opening being coaxial with said spindle, means associated with said spindle and releasably engageable with the drive shaft, a male spindle including a shaft having an end engaged in the opening of said female spindle, a tapered body rotatably and slidably mounted on said shaft and frictionally engaged in said recess, a spaced stop member affixed to said shaft and effective to limit longitudinal movement of said body relative to said shaft, and means associated with said body and with said female spindle, and effective to prevent relative rotation between the two.

5. A spindle assembly adapted for mounting on a drive shaft, for carrying a tool, and for transmitting power from the drive shaft to the tool, said assembly comprising, in combination, a female spindle having a tapered recess therein with a closed small end and an open large end, and having an opening at the small end of the recess, the recess and the opening being coaxial with said spindle, a male spindle including a shaft having an end engaged in the opening of said female spindle, a tapered body rotatably and slidably mounted on said shaft and frictionally engaged in said recess, a stop member affixed to said shaft and effective to limit longitudinal movement of said body relative to said shaft and to aid in withdrawing said body from the recess when said shaft is withdrawn, an annular grinding tool having a generally axially extending surface of revolution, and means for concentrically and non-rotatably securing said grinding tool around said shaft outwardly of said tapered recess and said tapered body, with the outer end of said shaft projecting beyond said grinding tool and having exposed means for rotating said shaft relative to said female spindle.

References Cited in the file of this patent

UNITED STATES PATENTS

| | | |
|---|---|---|
| 364,080 | Barber | May 31, 1887 |
| 1,562,969 | Jordan et al. | Nov. 24, 1925 |
| 1,979,325 | Goldberg | Nov. 6, 1934 |
| 2,203,943 | Davis | June 11, 1940 |
| 2,566,449 | Hornbostel | Sept. 4, 1951 |
| 3,055,272 | Zwick | Sept. 25, 1962 |